US008954685B2

(12) United States Patent
Bakke et al.

(10) Patent No.: US 8,954,685 B2
(45) Date of Patent: Feb. 10, 2015

(54) VIRTUALIZED SAS ADAPTER WITH LOGIC UNIT PARTITIONING

(75) Inventors: Brian E Bakke, Rochester, MN (US); Ellen M Bauman, Rochester, MN (US); Timothy J Schimke, Stewartville, MN (US); Lee A Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/144,174

(22) Filed: Jun. 23, 2008

(65) Prior Publication Data

US 2009/0319728 A1    Dec. 24, 2009

(51) Int. Cl.
*G06F 12/00* (2006.01)
*G06F 3/06* (2006.01)

(52) U.S. Cl.
CPC ............ *G06F 3/0664* (2013.01); *G06F 3/0626* (2013.01); *G06F 3/0637* (2013.01); *G06F 3/0689* (2013.01)
USPC ........... 711/150; 711/202; 711/203; 711/206; 711/E12.058

(58) Field of Classification Search
USPC ................................. 711/206, 150, 202, 203
See application file for complete search history.

(56) References Cited

U.S. PATENT DOCUMENTS

| | | | |
|---|---|---|---|
| 7,284,104 B1 * | 10/2007 | Wu et al. | 711/162 |
| 7,343,467 B2 * | 3/2008 | Brown et al. | 711/203 |
| 7,464,405 B2 * | 12/2008 | Dawkins et al. | 726/17 |
| 7,644,204 B2 | 1/2010 | Marripudi et al. | |
| 2002/0010811 A1 * | 1/2002 | Arndt et al. | 710/5 |
| 2003/0212873 A1 * | 11/2003 | Lee et al. | 711/170 |
| 2005/0071574 A1 * | 3/2005 | Frenzel et al. | 711/148 |
| 2006/0050678 A1 * | 3/2006 | Wellig et al. | 370/349 |
| 2006/0064567 A1 * | 3/2006 | Jacobson et al. | 711/207 |
| 2006/0174087 A1 * | 8/2006 | Hashimoto et al. | 711/173 |
| 2006/0195673 A1 * | 8/2006 | Arndt et al. | 711/173 |
| 2007/0136554 A1 * | 6/2007 | Biran et al. | 711/203 |
| 2007/0165660 A1 * | 7/2007 | Fang et al. | 370/410 |
| 2008/0189570 A1 | 8/2008 | Terashima et al. | |
| 2009/0150640 A1 | 6/2009 | Royer et al. | |

* cited by examiner

*Primary Examiner* — Aracelis Ruiz
(74) *Attorney, Agent, or Firm* — Rabin & Berdo, PC

(57) ABSTRACT

A method, computer program product and computer system for virtualizing an SAS storage adapter, so as to allow logical partitions of a computer system to share a storage device. The method, computer program product and computer system includes assigning a logical storage adapter to an operating system of each of the logical partitions; creating a mapping from each of the logical partitions to a set of logical blocks in the storage device; and configuring the logical storage adapter using a hypervisor, so that a select partition can access a select set of logical blocks that the select partition is allowed to access.

24 Claims, 5 Drawing Sheets

| Partition ID | LUN ID | Logic Block Address | Length (blocks) |
|---|---|---|---|
| 101 | 140 | 212 | 512 |
| 102 | 150 | 768 | 512 |
| 103 | 160 | 1288 | 2048 |
| 104 | 160 | 3360 | 256 |

FIG. 3

VIRTUALIZED SAS ADAPTER WITH LOGIC UNIT PARTITIONING

CROSS REFERENCE TO RELATED APPLICATIONS

This present application is related to co-pending U.S. patent application entitled—"Virtualized Serial Attached SCSI Adapter,", filed on May 7, 2008, and assigned Ser. No. 12/116,650.

BACKGROUND

1. Technical Field

The present invention relates to storage adapters. More specifically, it relates to the virtualization of an SAS (Serial Attached Small Computer System Interface) adapter for logical partitions of a computer system.

2. Background Information

Large computer systems are usually partitioned into a number of logical partitions. Each logical partition represents a division of resources in the system and operates as an independent logical system. An example of logical partitions is the partitioning of a multiprocessor computer system into multiple independent servers, each with it own processors, main storage, and I/O devices.

A typical resource that each logical partition requires is disk storage. Many systems utilize SAS devices to provide storage. SAS is a data transfer technology designed to replace parallel SCSI (Small Computer System Interface) with added performance, scalability and redundancy. It can provide SATA (Serial Advanced Technology Attachment) compatibility and interoperability, cost-effective tiered storage deployments, and flexibility in disk drive and platform choices.

A drawback to current implementations of the logical partitions is that each partition is required to have its own storage adapter. Hence, for a large computer system, a large number of physical storage adapters are needed, and, to provide the associated PCI (Peripheral Component Interconnect) or PCI Express adapter slots for these adapters, a large number of enclosures are also required, which lead to significant additional expenses. Current implementations also require that each partition has its own storage devices, which results in an excess number of storage devices and the corresponding enclosures used to house them. Moreover, each enclosure typically is packaged as a single SAS domain so that the enclosure is limited to a single partition. Therefore, a partition that needs a single device (or a couple of devices) must bear the cost of the complete enclosure that may have many empty device slots, which also causes a significant waste of resources.

SUMMARY

A method, computer program product and computer system for virtualizing an SAS storage adapter, so as to allow logical partitions of a computer system to share a storage device. The method, computer program product and computer system includes assigning a logical storage adapter to an operating system of each of the logical partitions; creating a mapping from each of the logical partitions to a set of logical blocks in the storage device; and configuring the logical storage adapter using a hypervisor, so that a select partition can access a select set of logical blocks that the select partition is allowed to access.

BRIEF DESCRIPTION OF DRAWINGS

FIG. 3 is a table that shows the mapping of partitions to extents.

DETAILED DESCRIPTION

Figure 1:
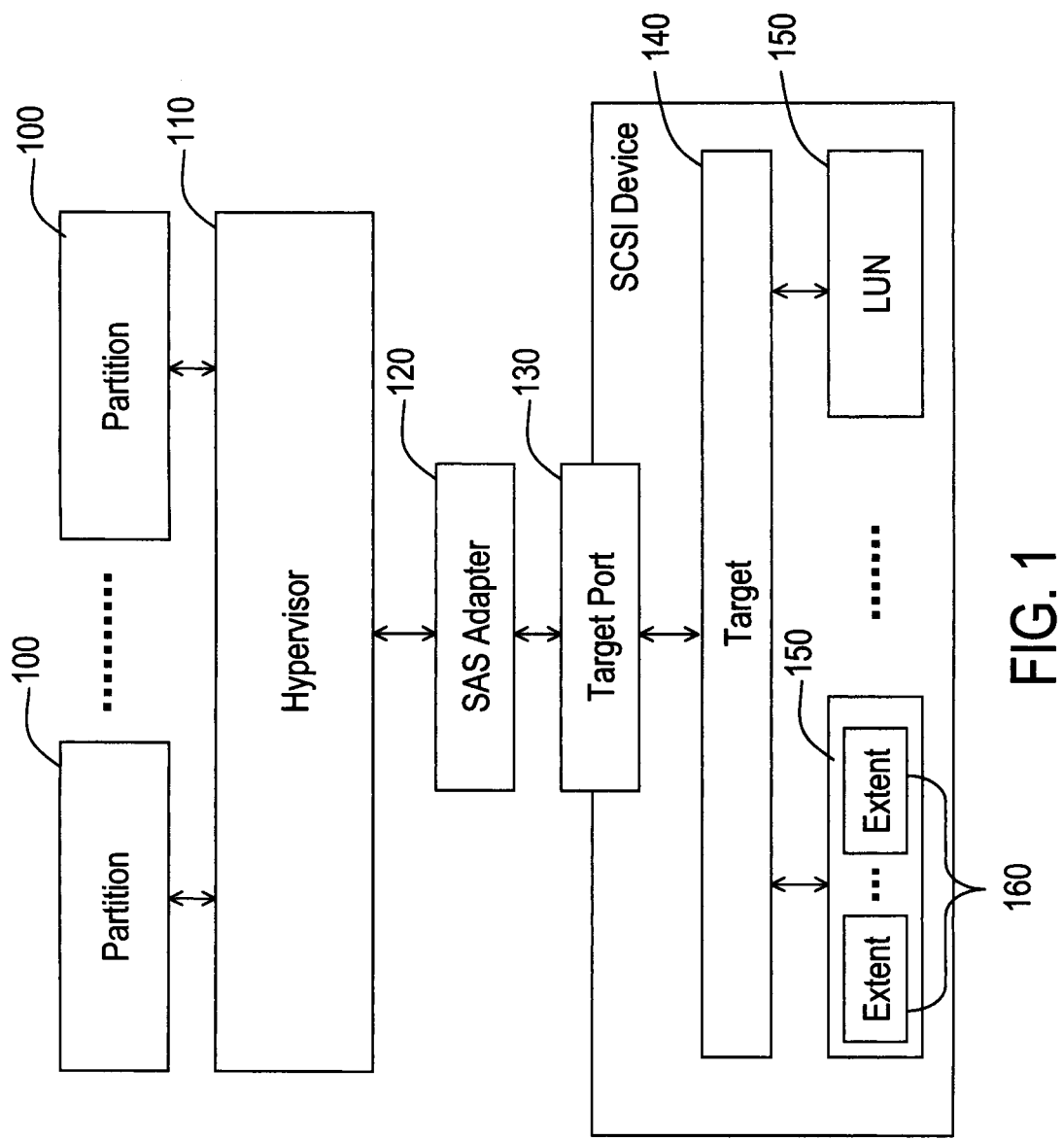
FIG. 1 is a block diagram showing that multiple partitions share a storage device.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention provides a method to virtualize a storage device, for example, a disk, so as to allow logical partitions, or even applications within the partitions, to have access to a portion of the storage device. A storage device is virtualized into multiple logical devices, and each partition sees only the logical device that the partition is allowed to access. The details of accessing the actual physical device are handled by hardware.

The present invention enables a method to subdivide a single storage device to allow different partitions to directly access the same physical device at the same time. Instead of queuing read/write requests through a third-party partition in the sharing of the storage device, as in the Virtual Input/Output (VIO) method, the present invention allows multiple partitions to share the storage device directly, thus providing a performance advantage.

In the present invention, accesses of the same physical device from different partitions are isolated from one another, so that a poorly behaved partition or a malicious partition is prevented from affecting other partitions using the same device. This isolation is implemented in hardware to minimize performance cost. User applications can be granted direct access to a subset of a storage device. Hardware enforces access limits so that a user application will not affect other storage devices or other portions of this storage device. No special capabilities or functions are needed for a storage device to utilize the present invention.

The relationship between partitions and disk resources can be encapsulated by an SCSI client-server service-delivery model. The client is called an SCSI initiator and the server is called an SCSI target. A SCSI target includes one or more logical storage entities, e.g. logic units each with a logic unit number (LUN). For example, for partitions accessing storage devices, a partition is an SCSI initiator, and a storage device is an SCSI target. A storage device (or target) may contain a single LUN, for example, when a small hard disk is used as the storage device. Or, a storage device may contain multiple LUNs, for instance, when the storage device includes external RAID boxes. A LUN unit here is a storage entity that can include part of the storage on a disk drive, the entire storage on a disk drive, the total storage on multiple drives in a disk array, or any combination thereof.

In a preferred embodiment of the present invention, a virtualization platform, also known as the hypervisor, sits on top of the physical hardware resources, and provides the function of administering resource management through the Hardware Management Console (HMC). The hypervisor provides a level of abstraction to the operating system. For example, from the perspective of the partition's operating system, virtual hardware resources appear as if they belong to that partition. The hypervisor controls partition access to the hardware resources. Each operating system receives a logical storage adapter that is a portion of the physical storage adapter. The hypervisor supports the configuration of a logical adapter, and exposes only those devices to which this adapter is allowed access. The logical storage adapter is treated by the partition just like a dedicated physical storage adapter.

In one embodiment of the present invention, a virtualized InfiniBand interface is implemented as a software interface to the physical host SAS adapter that is presented to the partition. The host SAS Adapter then maps the virtual interface into a physical SAS.

Host SAS Adapter configuration is initiated from the HMC. This configuration is performed by the hypervisor so that the partitions do not need to be involved. During the configuration, a logical SAS expander is implemented, and a set of initiators is created. Each logical operating system partition has a logical storage adapter. An initiator SAS address is assigned to each logical storage adaptor. Each logical storage adapter thus has its own initiator ID so that transactions on the SAS fabric can be executed properly. The Host SAS Adapter configuration set up the fabrics-related parameter of Initiator SAS address (I). The initiator address is a component of the Initiator_Target_LUN (I_T_L) Nexus. The system treats this logical adapter just like it would treat a dedicated physical adapter in SAS operations.

FIG. 1 is a block diagram showing that multiple partitions share a storage device. In FIG. 1, multiple partitions 100 (i.e. SCSI initiators) share a storage device 140 (i.e. SCSI target). A hypervisor 110 controls the accesses of partitions 110 to the storage device 140 via an SAS adapter 120 and a target port 130. The storage device 140 contains multiple logical storage entities—LUNs 150. With the virtualization of the SAS adapter 120, a partition 100 can access a LUN 150 as if the LUN 150 is a dedicated physical storage device connected to the partition 100 via a dedicated physical storage adapter.

Figure 2:
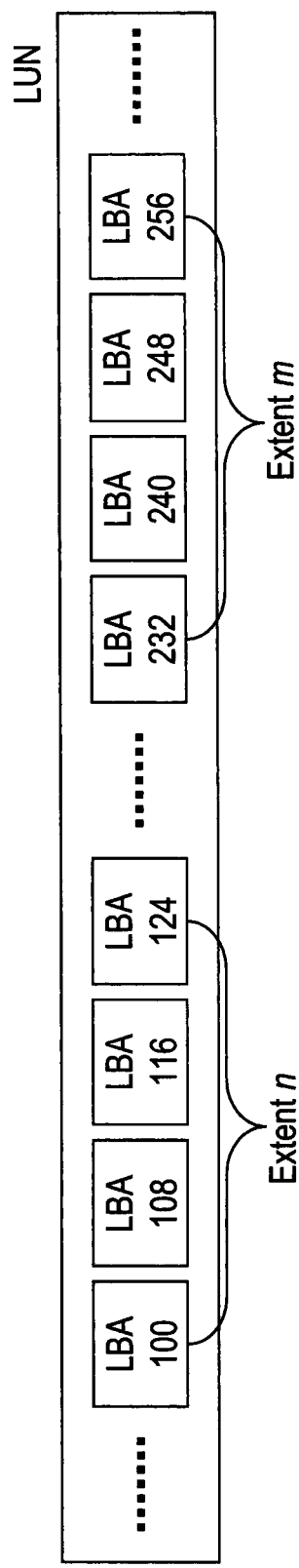
FIG. 2 is a block diagram illustrating extents, each of which contains multiple contiguous logical blocks.

The HMC is responsible for the configuration and assignment of the disk resources to different partitions. The present invention enables a logic storage unit of a storage device to be shared by multiple partitions, each of which has accesses to one or more "extent" that is a contiguous set of logic blocks under a single LUN. As illustrated in FIG. 1, an LUN 150 may contain one or more extents 160. FIG. 2 is a block diagram showing the extents, each of which contains multiple contiguous logical blocks.

The HMC constructs a table to associate a partition to an extent of a LUN. Each extent then appears to be a "logical" LUN for the partition. This table is sent to the hypervisor, which then uses this table to perform the mapping between the logical addresses of an extent and physical sectors on the storage device. FIG. 3 illustrates an exemplar table that associates a partition to an extent (i.e. a contiguous set of logic blocks) of a LUN, where the mapping contains a base address and a length of the extent. For example, partition 103 is associated to an extent of LUN 160, where the extent starts at the base address 1288 and has a length of 2048 blocks.

In one embodiment of the present invention, in order for a partition to communicate with a storage device through the InfiniBand interface, it first creates a work queue (WQ) that includes a queue pair (QP). To execute an operation, it places a work queue element (WQE) in the WQ, and the WQE is then executed by the SAS adapter. Therefore, the WQ forms the communications medium between the partition and the SAS adapter, relieving the operating system from being involved. Each process may create one or more QPs for communications, where each QP has an associated context. QPs can be implemented in hardware to off-load most of the work from the CPU. Once a WQE has been processed properly, a completion queue element (CQE) is created and placed in the completion queue (CQ). Using the CQ for notifying the caller of completed WQEs reduces the interrupts that would be otherwise generated.

Figure 4:
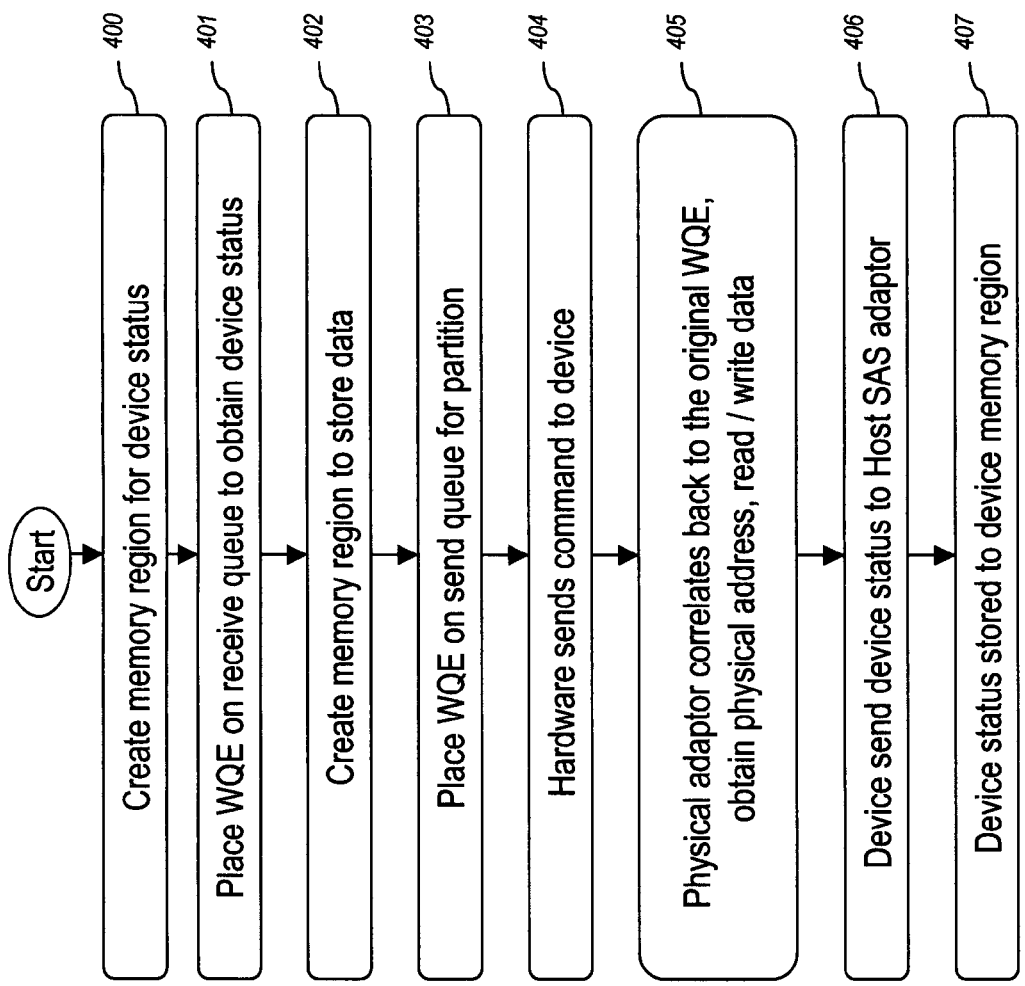
FIG. 4 is a flowchart illustrating a workflow in one embodiment of the present invention.

FIG. 4 is a flowchart illustrating this workflow in one embodiment of the present invention. First, memory regions are created for device status in state 400. In state 401, a WQE element is placed on the receive queue to receive the device status. In state 402, the memory region containing the data is identified via an Hcall as for the Host Channel Adapter in InfiniBand. This memory region Hcall maps a virtual area in memory to a physical address range so the hardware can access data directly to/from the memory region. During a read flow, this memory region is reserved to contain the read data received from the storage device. During a write flow, the SAS hardware will read the data from this memory region and send it to the device. In state 403, a WQE is formed and placed on the send queue for the partition. WQE contains a request ID and a memory region descriptor for read data. This WQE will contain SCSI CDB (Common Descriptor Block, including address/length/key) as well as a descriptor for the memory region which contains the data to be read/written. In state 404, the hardware sends command to the device, and then in state 405, the physical adapter uses an Initiator_Target_LUN_TaskIdentifer (I_T_L_Q) Nexus to get memory region ID from original send WQE, which is then used to get physical address and perform the read and write operations. In state 406, the storage device sends device status (e.g. SCSI status and auto sense) to the Host SAS adapter. Next in state 407, the device status is stored in the device status memory region described to receive queue WQE. The device status indicates the success or failure of the write, and, if the write fails, details of the failure.

A partition creates a QP to communicate with an extent, which appears to be a standard ordinary device for the partition. The hypervisor programs special registers within the QP to control the mapping between the partition and the extent. The mapping contains a base address and a length of the extent. The QPs, implemented in hardware, dynamically translate the virtual addressing of a read or write command to their physical addressing. In one embodiment of the present invention, this address translation is accomplished by adding the base address of the extent to the user-supplied address to generate the physical address. Range checking is implemented in hardware. If a derived physical address is out of range, the communication request will be returned back to the user via an error CQE placed on the CQ utilizing ordinary InfiniBand semantics. If the command is completed successfully, the user is notified by creating a CQE and placing it in the CQ. Each QP has a unique Initiator ID. This allows each extent-QP pair to be a unique I_T_L nexus from the perspective of the physical device, which allows standard handling of errors, if errors occur, with no special handling required. Because each extent is associated with a unique I_T_L nexus, all standard SCSI protocol is supported and works as expected for the "logical" LUNs. Read Capacity commands of the InfiniBand are also intercepted by the hardware. The disk size reported back to the user is the extent size assigned by HMC associated with this QP.

User access is easily limited to the respective "logical" LUN, i.e. a subset of each LUN, because of the hardware support for the extents. Now user applications can directly perform disk I/O without requiring kernel access, and misbehaving applications will not impact other users of the same disk. This improves performance and allows additional application optimization.

Figure 5:
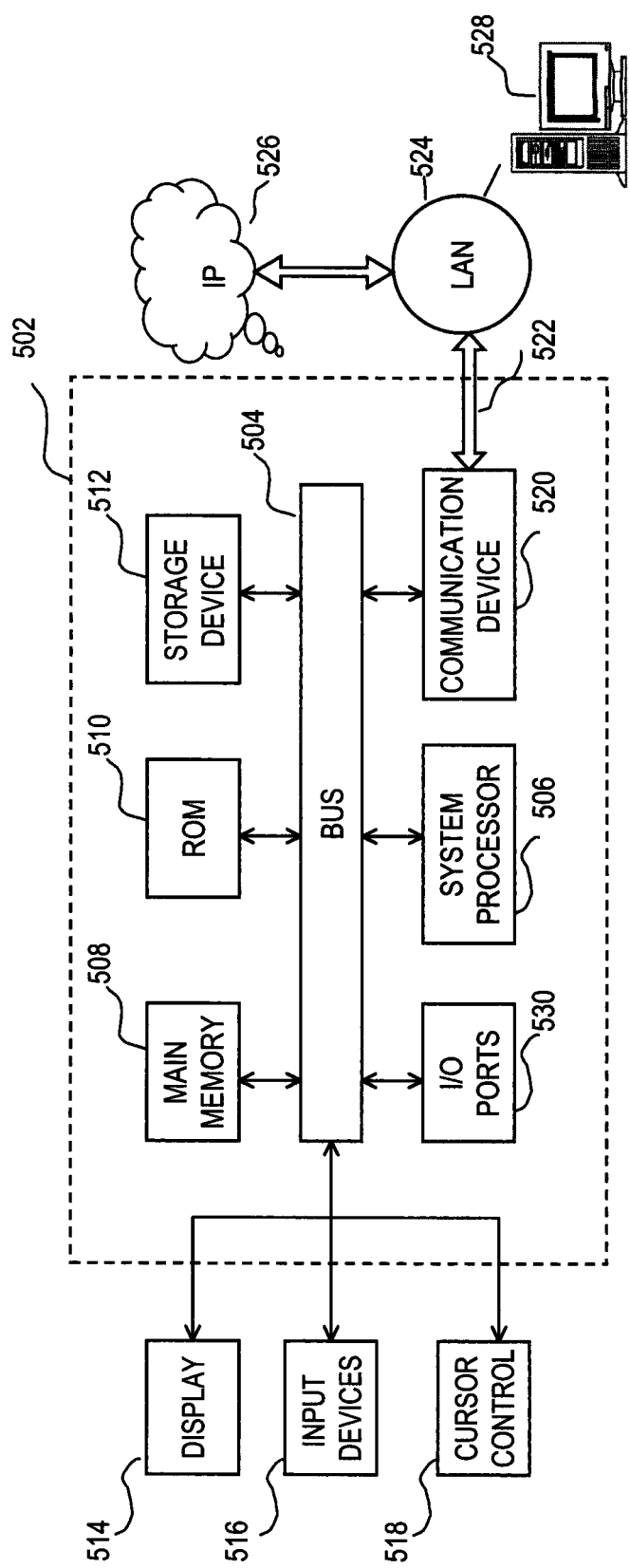
FIG. 5 is a conceptual diagram of a computer system that the present invention can be utilized.

FIG. 5 illustrates a computer system (502) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (504) or other communication mechanism for communicating information and a processor (506) coupled with bus (504) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (506). In addition, main memory (508) may be used for storing temporary variables or other intermediate information during execution of instructions to be executed by processor. The computer system further includes a read only memory (ROM) 510 or other static storage device (e.g., programmable ROM (PROM), erasable PROM (EPROM), and electrically erasable PROM (EEPROM)) coupled to bus 504 for storing static information and instructions for processor. A storage device (512), such as a magnetic disk or optical disk, is provided and coupled to bus for storing information and instructions. This storage device is an example of a computer readable medium.

The computer system also includes input/output ports (530) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 4. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (514), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (516) and a cursor control (518), for communicating information and command selections to processor (506). Such command selections can be implemented via voice recognition hardware and/or software functioning as the input devices (516). The cursor control (518), for example, is a mouse, a trackball, cursor direction keys, touch screen display, optical character recognition hardware and/or software, etc., for communicating direction information and command selections to processor (506) and for controlling cursor movement on the display (514). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (520) provides a two-way data communication coupling to a network link (522) that may be connected to, for example, a local network (524). For example, the communication interface (520) may be a network interface card to attach to any packet switched local area network (LAN). As another example, the communication interface (520) may be an asymmetrical digital subscriber line (ADSL) card, an integrated services digital network (ISDN) card or a modem to provide a data communication connection to a corresponding type of telephone line. Wireless links may also be implemented via the communication interface (520). In any such implementation, the communication interface (520) sends and receives electrical, electromagnetic or optical signals that carry digital data streams representing various types of information.

Network link (522) typically provides data communication through one or more networks to other data devices. For example, the network link may provide a connection to a computer (526) through local network (524) (e.g., a LAN) or through equipment operated by a service provider, which provides communication services through a communications network (528). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for virtualizing an SAS (Serial Attached Small Computer System Interface) storage adapter, so as to allow two logical partitions of a computer system, including a first logical partition and a second logical partition, to share a logical unit of a storage device via the SAS storage adapter, the method comprising:

creating a first logical storage adapter having a first initiator address, and assigning the first logical storage adapter to the first logical partition;

creating a second logical storage adapter having a second initiator address, and assigning the second logical storage adapter to the second logical partition;

creating a first mapping from the first logical partition to a first set of logical blocks in the logical unit of the storage device, thereby generating first mapping information;

creating a second mapping from the second logical partition to a second set of logical blocks in the logical unit of the storage device, thereby generating second mapping information;

upon receiving first and second data storage operations respectively accessing the first and second sets of logical blocks, dynamically translating virtual addressing of the first and second data storage operations using the first and second mapping information, to thereby obtain corresponding physical addresses of the first and second sets of logical blocks; and creating, for the SAS storage adapter, a first Initiator-Target-Logical Unit Number (I-T-L) nexus that associates the first initiator address, an address of the storage device and the physical address of the first set of logical blocks, and a second I-T-L nexus that associates the second initiator address, the address of the storage device and the physical address of the second set of logical blocks, to thereby allow the first and second logical partitions to simultaneously access the first and second sets of logical blocks in the logical unit of the storage device.

2. The method of claim 1, wherein the generating first and second mapping information comprises:

constructing a first table and a second table that respectively record the first mapping from the first logical partition to the first set of logical blocks in the logical unit of the storage device and the second mapping from the second logical partition to the second set of logical blocks in the logical unit of the storage device; and providing the first and second tables to a hypervisor, so as to allow the hypervisor to use the tables to configure the first and second logical storage adapters.

3. The method of claim 2, wherein the constructing is performed by a Hardware Management Console.

4. The method of claim 1, further comprising, for each of the first and second logical storage adaptors, implementing a logical SAS expander to obtain the first or second initiator address.

5. The method of claim 1, wherein the translating is performed by hardware.

6. The method of claim 1, wherein the first and second data storage operations each include at least one of a read operation and a write operation.

7. The method of claim 1, wherein the logical storage adapters provide an InfiniBand programming interface to the logical partitions.

8. The method of claim 1, wherein at least one of the first and second sets of logical blocks is a contiguous set of logical blocks.

9. A computer program product for virtualizing an SAS (Serial Attached Small Computer System Interface) storage adapter, so as to allow two logical partitions of a computer system, including a first logical partition and a second logical partition, to share a logical unit of a storage device via the SAS storage adapter, the computer program product comprising:

a non-transitory computer usable medium having computer usable program code embodied therewith, the computer usable program code comprising:

instructions to create a first logical storage adapter having a first initiator address, and to assign the first logical storage adapter to the first logical partition;

instructions to create a second logical storage adapter having a second initiator address, and to assign the second logical storage adapter to the second logical partition;

instructions to create a first mapping from the first logical partition to a first set of logical blocks in the logical unit of the storage device, thereby generating first mapping information;

instructions to create a second mapping from the second logical partition to a second set of logical blocks in the logical unit of the storage device, thereby generating second mapping information;

instructions to dynamically translate, upon receiving first and second data storage operations respectively accessing the first and second sets of logical blocks, virtual addressing of the first and second data storage operations using the first and second mapping information, to thereby obtain corresponding physical addresses of the first and second sets of logical blocks; and instructions to create, for the SAS storage adapter, a first Initiator-Target-Logical Unit Number (I-T-L) nexus that associates the first initiator address, an address of the storage device and the physical address of the first set of logical blocks, and a second I-T-L nexus that associates the second initiator address, the address of the storage device and the physical address of the second set of logical blocks, to thereby allow the first and second logical partitions to simultaneously access the first and second sets of logical blocks in the logical unit of the storage device.

10. The computer program product of claim 9, wherein the instructions to generate first and second mapping information comprise:

instructions to construct a first table and a second table that respectively record the first mapping from the first logical partition to the first set of logical blocks in the logical unit of the storage device and the second mapping from the second logical partition to the second set of logical blocks in the logical unit of the storage device; and instructions to provide the first and second tables to a hypervisor, so as to allow the hypervisor to use the tables to configure the first and second logical storage adapters.

11. The computer program product of claim 10, wherein the table is constructed by a Hardware Management Console.

12. The computer program product of claim 9, further comprising, for each of the first and second logical storage adaptors, instructions to implement a logical SAS expander to obtain the first or second initiator address.

13. The computer program product of claim 9, wherein the dynamic translation is performed by hardware.

14. The computer program product of claim 9, wherein the first and second data storage operations each include at least one of a read operation and a write operation.

15. The computer program product of claim 9, wherein the logical storage adapters provide an InfiniBand programming interface to the logical partitions.

16. The computer program product of claim 9, wherein at least one of the first and second sets of logical blocks is a contiguous set of logical blocks.

17. A computer system comprising:

a processor;

a memory operatively coupled with the processor;

a storage device operatively coupled with the processor and the memory; and a computer program product for virtualizing an SAS (Serial Attached Small Computer System Interface) storage adapter, so as to allow two logical partitions of the computer system, including a first logical partition and a second logical partition, to share a logical unit of the storage device via the SAS storage adapter, the computer program product comprising:

a non-transitory computer usable medium having computer usable program code embodied therewith, the computer usable program code comprising:

instructions to create a first logical storage adapter having a first initiator address, and to assign the first logical storage adapter to the first logical partition;

instructions to create a second logical storage adapter having a second initiator address, and to assign the second logical storage adapter to the second logical partition;

instructions to create a first mapping from the first logical partition to a first set of logical blocks in the logical unit of the storage device, thereby generating first mapping information;

instructions to create a second mapping from the second logical partition to a second set of logical blocks in the logical unit of the storage device, thereby generating second mapping information;

instructions to dynamically translate, upon receiving first and second data storage operations respectively accessing the first and second sets of logical blocks, virtual addressing of the first and second data storage operations using the first and second mapping information, to thereby obtain corresponding physical addresses of the first and second sets of logical blocks; and instructions to create, for the SAS storage adapter, a first Initiator-Target-Logical Unit Number (I-T-L) nexus that associates the first initiator address, an address of the storage device and the physical address of the first set of logical blocks, and a second I-T-L nexus that associates the second initiator address, the address of the storage device and the physical address of the second set of logical blocks, to thereby allow the first and second logical partitions to simultaneously access the first and second sets of logical blocks in the logical unit of the storage device.

18. The computer system of claim 17, wherein the instructions to generate first and second mapping information comprise:

instructions to construct a first table and a second table that respectively record the first mapping from the first logical partition to the first set of logical blocks in the logical unit of the storage device and the second mapping from the second logical partition to the second set of logical blocks in the logical unit of the storage device; and instructions to provide the first and second tables to a hypervisor, so as to allow the hypervisor to use the tables to configure the first and second logical storage adapters.

19. The computer system of claim 18, wherein the table is constructed by a Hardware Management Console.

20. The computer system of claim 17, further comprising, for each of the first and second logical storage adaptors, instructions to implement a logical SAS expander to obtain the first or second initiator address.

21. The computer system of claim 17, wherein the dynamic translation is performed by hardware.

22. The computer system of claim 17, wherein the first and second data storage operations each include at least one of a read operation and a write operation.

23. The computer system of claim 17, wherein the logical storage adapters provide an InfiniBand programming interface to the logical partitions.

24. The computer system of claim 17, wherein at least one of the first and second sets of logical blocks is a contiguous set of logical blocks.

* * * * *